US010618820B2

(12) United States Patent
Ahn et al.

(10) Patent No.: US 10,618,820 B2
(45) Date of Patent: Apr. 14, 2020

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: SAMSUNG SDI CO., LTD., Yongin-si, Gyeonggi-do (KR)

(72) Inventors: Kiyong Ahn, Yongin-si (KR); Sung-Soo Park, Yongin-si (KR)

(73) Assignee: Samsung SDI Co., Ltd., Yongin-Gyeonggi-do (KR)

( * ) Notice: Subject to any disclaimer, the term of this patent is extended or adjusted under 35 U.S.C. 154(b) by 388 days.

(21) Appl. No.: 14/943,582

(22) Filed: Nov. 17, 2015

(65) Prior Publication Data
US 2016/0141606 A1    May 19, 2016

(30) Foreign Application Priority Data

Nov. 19, 2014  (KR) .................... 10-2014-0161735

(51) Int. Cl.
*H01B 1/08* (2006.01)
*C01G 51/00* (2006.01)
(Continued)

(52) U.S. Cl.
CPC .......... *C01G 51/006* (2013.01); *C01G 51/42* (2013.01); *H01B 1/08* (2013.01); *H01M 4/485* (2013.01);
(Continued)

(58) Field of Classification Search
CPC ..... C01G 51/006; C01G 51/42; H01M 4/485; H01M 10/0525; H01M 2004/028;
(Continued)

(56) References Cited

U.S. PATENT DOCUMENTS 5,478,674 A * 12/1995 Miyasaka ............. H01M 4/485
                                                        429/223
7,235,193 B2   6/2007 Park et al.
(Continued)

FOREIGN PATENT DOCUMENTS

KR   10-2002-0092189 A   12/2002
KR   10-2003-0083476 A   10/2003
(Continued)

OTHER PUBLICATIONS

Reimers, et al., "Electrochemical and In Situ X-Ray Diffraction Studies of Lithium Intercalation in $Li_x CoO_2$," The Electrochemical Society, 139 (1992) pp. 2091-2097.
(Continued)

*Primary Examiner* — Mark Kopec
*Assistant Examiner* — Jaison P Thomas
(74) *Attorney, Agent, or Firm* — Lee IP Law, P.C.

(57) ABSTRACT

A positive active material for a rechargeable lithium battery includes a lithium metal oxide represented by the following Chemical Formula 1:

$(Li_{1-(x+y)}Na_xK_y)(Co_{1-(a+b)}Zr_aM'_b)O_2$  [Chemical Formula 1]

wherein, $0<x\leq0.1$, $0\leq y\leq0.1$, $0<x+y\leq0.1$, $0<a\leq0.1$, $0\leq b\leq0.1$ and $0<a+b\leq0.1$, and M' is at least one element selected from Y, Nb, V, Cr, Mn, Fe, Ni, Cu, Zn, Mg, Ca, and Sr.

7 Claims, 3 Drawing Sheets

(51) Int. Cl.
*H01M 4/485* (2010.01)
*H01M 10/0525* (2010.01)
*H01M 4/02* (2006.01)
*H01M 10/052* (2010.01)

(52) U.S. Cl.
CPC ..... *H01M 10/0525* (2013.01); *C01P 2002/50* (2013.01); *C01P 2002/52* (2013.01); *C01P 2006/40* (2013.01); *H01M 10/052* (2013.01); *H01M 2004/028* (2013.01)

(58) Field of Classification Search
CPC ........... H01M 10/052; H01M 2220/30; H01M 4/366; H01M 4/381; H01M 4/382; H01M 4/505; H01M 4/525; H01M 4/621; H01M 4/624; H01M 4/625; H01M 6/164; H01M 6/168; C01P 2002/50; C01P 2002/52; C01P 2006/40; H01B 1/08
USPC ....................................... 252/500
See application file for complete search history.

(56) References Cited

U.S. PATENT DOCUMENTS

| 2007/0224504 | A1* | 9/2007 | Kita ..................... H01M 4/131 429/231.1 |
| 2014/0054493 | A1 | 2/2014 | Kim et al. |
| 2016/0315320 | A1* | 10/2016 | Matsuda ............... H01M 4/505 |

FOREIGN PATENT DOCUMENTS

| KR | 10-2012-0009779 A | 2/2012 | |
| KR | 10-2013-0005885 A | 1/2013 | |
| KR | 10-2014-0000490 A | 1/2014 | |
| KR | 10-2014-0026841 A | 3/2014 | |
| WO | WO-2015088007 A1 * | 6/2015 | ............ H01M 4/505 |

OTHER PUBLICATIONS

Ohzuku, et al., "Solid-State Redox Reactions of $LiCoO_2$ (R3m) for 4 Volt Secondary Lithium Cells," The Electrochemical Society, 141 (1994) pp. 2972-2977.

Tomeno, et. al., "NMR Study of $LiCo_{1-x}Cr_xO_2$ and $Li_{1-x}Na_xCoO_2$ (x=0 and 0.05)" Journal of the Physical Society of Japan, 67 (1998) pp. 318-322.

Cho, et al., "Novel $LiCoO_2$ Cathode Material with $Al_2O_3$ Coating for a Li Ion Cell," Chem. Mater. 12 (2000) pp. 3788-3791.

Cho, et al., "Zero-Strain Intercalation Cathode for Rechargeable Li-Ion Cell," Angew. Chem. Int. Ed. Engl. 40 (2001) pp. 3367-3369.

Chen, et al., "Effect of a $ZrO_2$ Coating on the Structure and Electrochemistry of $Li_xCoO_2$ When Cycled to 4.5 V," Electrochem. Solid-State Lett. 5 (2002) pp. A213-A216.

Dong, et al., "Nickel K-edge XANES/EXAFS on Nickel Containing Sodium Borosilicate Glasses", Canadian Light Source, Activity Report (2008) pp. 48-49.

Kim, et. al., "Structural Stability During Charge-Discharge Cycles in Zr-doped $LiCoO_2$ Powders," Journal of the Korean. Ceramic Society. 45 (2008) pp. 167-171.

Jo, et al., "Effect of $LiCoO_2$ Cathode Nanoparticle Size on High Rate Performance for Li-Ion Batteries," Journal of the Electrochemical Society, 156 (2009) pp. A430-A434.

Fisher, et. al., "Atomic Level Investigations of Lithium Ion Battery Cathode Materials," J. Phys. Soc. Jpn. 79 (2010) pp. 59-64.

Xiong, et al., "The Atomic and Electronic Structure Change Upon Delithiation of $LiCoO_2$: From First Principles Calculations," Int. J. Electrochem. Sci., 7 (2012) pp. 9390-9400.

Giogetti, "A Review on the Structural Studies of Batteries and Host Materials by X-Ray Absorption Spectroscopy",(2013) I, Article ID 938625.

* cited by examiner

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATION

Korean Patent Application No. 10-2014-0161735, filed on Nov. 19, 2014, in the Korean Intellectual Property Office, and entitled: "Positive Active Material For Rechargeable Lithium Battery, Method Of Preparing Same, and Rechargeable Lithium Battery Including Same," is incorporated by reference herein in its entirety.

BACKGROUND

1. Field

Embodiments relate to a positive active material for a rechargeable lithium battery, a method of preparing the same, and a rechargeable lithium battery including the same.

2. Description of the Related Art $LiCoO_2$ is currently the most widely used positive active material in the lithium ion battery field. This material has a layered structure of a hexagonal system, in which Li and Co are separated by an oxygen layer.

SUMMARY

Embodiments are directed to a positive active material for a rechargeable lithium battery, the positive active material including lithium metal oxide represented by the following Chemical Formula 1:

$$(Li_{1-(x+y)}Na_xK_y)(Co_{1-(a+b)}Zr_aM'_b)O_2 \quad \text{[Chemical Formula 1]}$$

wherein,
$0 < x \leq 0.1$, $0 \leq y \leq 0.1$, $0 < x+y \leq 0.1$, $0 < a \leq 0.1$, $0 \leq b \leq 0.1$ and $0 < a+b \leq 0.1$, and
M' is at least one element selected from Y, Nb, V, Cr, Mn, Fe, Ni, Cu, Zn, Mg, Ca, and Sr. (In Chemical Formula 1, K is potassium.)

The lithium metal oxide may have the following ranges: $0 < x \leq 0.05$, $0 \leq y \leq 0.05$, $0 < x+y \leq 0.05$, $0 < a \leq 0.05$, $0 \leq b \leq 0.05$ and $0 < a+b \leq 0.05$ in the above Chemical Formula 1.

The lithium metal oxide may be represented by the following Chemical Formula 2:

$$(Li_{1-x}Na_x)(Co_{1-a}Zr_a)O_2 \quad \text{[Chemical Formula 2]}$$

wherein, $0.001 < x \leq 0.05$ and $0.001 < a \leq 0.05$.

The lithium metal oxide may be obtained by substituting some of Li in lithium cobalt oxide with Na and some of Co in lithium cobalt oxide with Zr.

Embodiments are also directed to a method of preparing a positive active material for a rechargeable lithium battery, the method including mixing one of Li and a Li raw material, one of Co and a Co raw material, one of Na and a Na raw material and one of Zr and a Zr raw material, optionally one of K and a raw material of K, and optionally one of a metal represented by M' and a raw material of the metal represented by M' to obtain a mixture, and heat-treating the mixture to prepare lithium metal oxide represented by the following Chemical Formula 1:

$$(Li_{1-(x+y)}Na_xK_y)(Co_{1-(a+b)}Zr_aM'_b)O_2 \quad \text{[Chemical Formula 1]}$$

wherein,
$0 < x \leq 0.1$, $0 \leq y \leq 0.1$, $0 < x+y \leq 0.1$, $0 < a \leq 0.1$, $0 \leq b \leq 0.1$ and $0 < a+b \leq 0.1$, and
M' is at least one element selected from Y, Nb, V, Cr, Mn, Fe, Ni, Cu, Zn, Mg, Ca, and Sr.

Embodiments are also directed to a method of preparing a positive active material for a rechargeable lithium battery including mixing one of Li and a Li raw material, one of Co and a Co raw material, one of Na and a Na raw material and one of Zr and a Zr raw material to obtain a mixture, and heat-treating the mixture.

Mixing one of Li and a Li raw material, one of Co and a Co raw material, one of Na and a Na raw material and one of Zr and a Zr raw material to obtain a mixture and heat-treating the mixture may prepare a lithium metal oxide represented by the following Chemical Formula 2:

$$(Li_{1-x}Na_x)(Co_{1-a}Zr_a)O_2 \quad \text{[Chemical Formula 2]}$$

wherein, $0.001 < x \leq 0.05$ and $0.001 < a \leq 0.05$.

Mixing one of Li and a Li raw material, one of Co and a Co raw material, one of Na and a Na raw material and one of Zr and a Zr raw material may further include mixing one of K and a raw material of K to obtain the mixture.

Mixing one of Li and a Li raw material, one of Co and a Co raw material, one of Na and a Na raw material and one of Zr and a Zr raw material may further include mixing one of M' and a raw material of the metal represented by M' to obtain the mixture, wherein M' is at least one element selected from Y, Nb, V, Cr, Mn, Fe, Ni, Cu, Zn, Mg, Ca, and Sr.

Mixing one of Li and a Li raw material, one of Co and a Co raw material, one of Na and a Na raw material and one of Zr and a Zr raw material may further include mixing one of K and a raw material of K and one of M' and a raw material of the metal represented by M' to obtain the mixture, wherein M' is at least one element selected from Y, Nb, V, Cr, Mn, Fe, Ni, Cu, Zn, Mg, Ca, and Sr.

Embodiments are also directed to a rechargeable lithium battery including a positive electrode including the positive active material.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
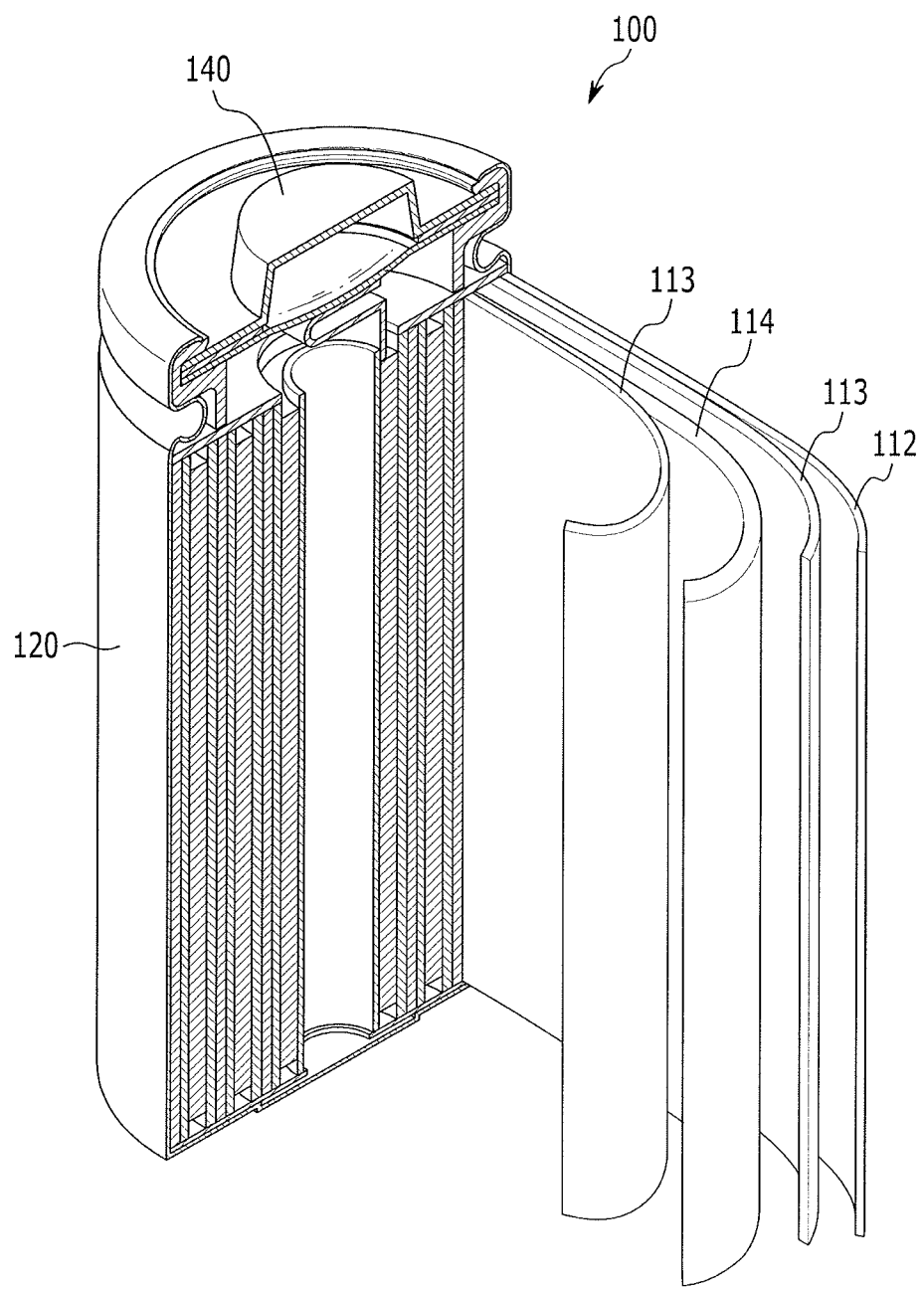
FIG. 1 illustrates a schematic view showing a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

The positive active material according to the present embodiment may include a lithium metal oxide represented by the following Chemical Formula 1.

$(Li_{1-(x+y)}Na_xK_y)(Co_{1-(a+b)}Zr_aM'_b)O_2$ [Chemical Formula 1]

In Chemical Formula 1, 0<x≤0.1, 0≤y≤0.1, 0<x+y≤0.1, 0<a≤0.1, 0≤b≤0.1 and 0<a+b≤0.1, specifically 0<x≤0.05, 0≤y≤0.05, 0<x+y≤0.05, 0<a≤0.05, 0≤b≤0.05 and 0<a+b≤0.05, more specifically 0.001<x≤0.05, 0≤y≤0.05, 0.001<x+y≤0.05, 0.001<a≤0.05, 0≤b≤0.05, and 0.001<a+b≤0.05, and M' is at least one element selected from Y, Nb, V, Cr, Mn, Fe, Ni, Cu, Zn, Mg, Ca, and Sr.

The lithium metal oxide may be obtained by substituting some of Li in lithium cobalt oxide, $LiCoO_2$ with sodium (Na), and optionally with potassium (K), and simultaneously by substituting a some of Co with zirconium (Zr), and optionally with an element represented by the M', as in the above Chemical Formula 1. In this way, by substituting a part of Li with Na, the positive active material may be suppressed from polarization at a high current rate, and by substituting a part of Co with Zr, structural stability of the positive active material may be improved. Thus, excellent stability and rate capability of a rechargeable lithium battery may be simultaneously secured by applying the positive active material.

For example, the amount of Li in $LiCoO_2$ is decreased as charging and discharging are repeated. When a mole ratio of Li decreases from 1 to less than or equal to about 0.6, the structure of the $LiCoO_2$ may be sharply changed. According to an embodiment, this structural instability according to a phase change may be complemented by substituting a part of Co with Zr. Thus, stability of a battery may be improved.

In addition, comparing deintercalation energy of Na and Li, since Li tends to be more easily deintercalated than Na, Na may become an internal axis and may lead movement of the Li into various directions. Thus, the presence of Na may improve an overall movement rate of the lithium. Accordingly, the rate capability of a battery may be improved by substituting a some of Li with Na.

The structure of the lithium metal oxide in which some of Li is substituted with Na and some of Co is substituted with Zr may be identified through an X-ray absorption fine structure (XAFS) analysis method, which may provide their atomic structures.

The amount of Zr substituted with Co may be small, for example, within a range of 0<a≤0.1 in Chemical Formula 1. When Zr is substituted in a small amount, a lattice size may increase in order to facilitate movement of Li due to Zr. Thus, the presence of the small amount of Zr may decrease an influence of lattice expansion and improve structural stability during charge and discharge.

In addition, the amount of Na that is substituted with Li may be small, for example, within a range of 0<x≤0.1 in the Chemical Formula 1. When Na is substituted in a small amount, high Li ion conductivity may be obtained. Thus, the presence of the small amount of Na may minimize polarization during charge and discharge. As a result, the rate capability of a battery may be improved.

The substitution amounts of Na and Zr in the lithium metal oxide may be identified by using high resolution transmission electron microscopy (TEM) and energy dispersive spectroscopy (EDS) together.

Specific examples of the lithium metal oxide may be represented by the following Chemical Formula 2.

$(Li_{1-x}Na_x)(Co_{1-a}Zr_a)O_2$ [Chemical Formula 2]

In the Chemical Formula 2, 0.001<x≤0.05 and 0.001<a≤0.05.

Hereinafter, a method of preparing the positive active material is described.

A lithium metal oxide represented by the Chemical Formula 1 may be prepared using a solid-phase method. Specifically, one of Li and a Li raw material, one of Co and a Co raw material, one of Na and a Na raw material and one of Zr and a Zr raw material, optionally one of a metal represented by K and a raw material of K and one of a metal represented by M' and a raw material of the metal represented by M' may be mixed, and then heat-treated.

The metals of Li, Co, Na, Zr, K and M' may be provided as as powder. The Li raw material, the Co raw material, the Na raw material, the Zr raw material, the K raw material and the M' raw material may be provided as a salt including the particular metal, a complex of the metal coordinated with an organic ligand, or the like, for example, as a salt of carbonate, hydroxide, nitrate, or the like.

The mixing may be simultaneously performed with the pulverizing under an inert atmosphere such as argon or the like. The pulverizing may be performed by using a suitable method of pulverizing and mixing, such as using a ball mill or the like.

The heat treatment may be performed may be performed under an appropriately selected condition. For example, the heat treatment may be performed at about 800° C. to about 1,100° C. for about 3 hours to about 15 hours while dry air is made to flow therein.

The heat-treated lithium metal oxide may be dried and cooled down in a furnace.

The lithium metal oxide may be obtained in a sol-gel method, a self-sustaining combustion synthesis method, an ultrasonic wave-spray combustion synthesis method or the like.

The sol-gel method is a method of preparing inorganic oxide powder by hydrolyzing an alkoxide or the like to obtain sol and gelating the sol. By this method, a particle size may be controlled and a uniform and ultra pure lithium metal oxide may be provided.

The self-sustaining combustion synthesis method is a method in which in which powder is prepared by making an aqueous solution with only metallic nitrate, adding a glycine fuel thereto, and heating the mixture to lead a combustion reaction. This method is also called a glycine nitrate process.

The ultrasonic wave-spray combustion synthesis method is a method of preparing a desired inorganic oxide raw material powder by leading fine droplets of a metallic salt solution into a high temperature atmosphere through an ultrasonic wave-spray to evaporate a solvent quickly, decomposing a salt and oxidizing each component.

Hereinafter, a rechargeable lithium battery including the positive active material is described referring to FIG. 1.

FIG. 1 illustrates a schematic view showing a rechargeable lithium battery according to an embodiment.

Referring to FIG. 1, a rechargeable lithium battery 100 according to an embodiment may include an electrode assembly including a positive electrode 114, a negative electrode 112 facing the positive electrode 114, a separator 113 interposed between the negative electrode 112 and the positive electrode 114, an electrolyte solution impregnating the positive electrode 114, the negative electrode 112, and the separator 113, a battery case 120 housing the electrode assembly, and a sealing member 140 sealing the battery case 120.

The positive electrode 114 may include a current collector and a positive active material layer formed on the current collector. The positive active material layer may include a positive active material, binder, and optionally a conductive material.

The current collector may include Al, as an example.

The positive active material may be the lithium metal oxide described above. When the lithium metal oxide is used as the positive active material, a rechargeable lithium battery having excellent stability and rate capability may be realized.

The binder improves binding properties of positive active material particles with one another and with a current collector. Examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material improves the electrical conductivity of an electrode. A suitable electrically conductive material that does not cause a chemical change may be used as a conductive material. Examples thereof include one or more of natural graphite, artificial graphite, carbon black, acetylene black, ketjen black, a carbon fiber, a metal powder or a metal fiber of a copper, nickel, aluminum, silver, or the like, a conductive material such as a polyphenylene derivative or the like.

The negative electrode 112 may include a current collector and a negative active material layer formed on the current collector.

The current collector may include Cu, as an example.

The negative active material layer may include a negative active material, a binder, and optionally a conductive material.

The negative active material may include a material that reversibly intercalates/deintercalates lithium ions, lithium metal, lithium metal alloy, a material being capable of doping and dedoping lithium, or transition metal oxide.

The material that reversibly intercalates/deintercalates lithium ions may be a suitable carbon material for a carbon-based negative active material in a rechargeable lithium battery. Examples thereof may include crystalline carbon, amorphous carbon or a mixture thereof. Examples of the crystalline carbon may include non-shaped, sheet-shaped, flake-shaped, spherical shape or fiber-shaped natural graphite or artificial graphite. Examples of the amorphous carbon may include soft carbon or hard carbon, a mesophase pitch carbonized product, fired coke, or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$ (0<x<2), a Si—C composite, a Si-Q alloy (wherein Q is an alkali metal, an alkaline-earth metal, Group 13 to Group 16 elements, a transition metal, a rare earth element or a combination thereof, and not Si), Sn, $SnO_2$, a Sn-C composite, Sn-R (wherein R is an alkali metal, an alkaline-earth metal, Group 13 to Group 16 elements, a transition metal, a rare earth element or a combination thereof, and not Sn), and the like, and at least one thereof may be used with $SiO_2$. Specific examples of the Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po or a combination thereof.

The transition metal oxide may include vanadium oxide or lithium vanadium oxide.

The binder improves binding properties of negative active material particles with one another and with a current collector. Examples of the binder include polyvinyl alcohol, carboxymethyl cellulose, hydroxypropyl cellulose, polyvinylchloride, carboxylated polyvinylchloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material improves electrical conductivity of an electrode. A suitable electrically conductive material that does not cause a chemical change may be used as a conductive material. Examples thereof may include a carbon-based material such as natural graphite, artificial graphite, carbon black, acetylene black, ketjen black, a carbon fiber or the like; a metal-based material such as a metal powder, a metal fiber, or the like of copper, nickel, aluminum, silver, or the like; a conductive polymer such as a polyphenylene derivative or the like; or a mixture thereof.

The negative electrode 112 and the positive electrode 114 may each be prepared by mixing the respective active material, conductive material and binder in a solvent to prepare slurry, and coating the slurry onto a respective current collector. The solvent may include N-methylpyrrolidone, or the like. When the binder is an aqueous binder, the solvent may be water, as an example. A suitable electrode manufacturing method may be used.

The electrolyte solution may include a non-aqueous organic solvent and a lithium salt.

The non-aqueous organic solvent may serve as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

When a linear carbonate compound and a cyclic carbonate compound are mixed, a solvent having a high dielectric constant and a low viscosity may be provided. The cyclic carbonate compound and linear carbonate compound may be mixed together in a volume ratio ranging from about 1:1 to about 1:9.

The ester-based solvent may include, for example methylacetate, ethylacetate, n-propylacetate, dimethylacetate, methylpropionate, ethylpropionate, γ-butyrolactone, decanolide, valerolactone, mevalonolactone, caprolactone, or the like. The ether-based solvent may include, for example dibutylether, tetraglyme, diglyme, dimethoxyethane, 2-methyltetrahydrofuran, tetrahydrofuran, or the like, and the ketone-based solvent may include cyclohexanone, or the like. The alcohol-based solvent may include ethyl alcohol, isopropyl alcohol, or the like.

The non-aqueous organic solvent may be used singularly or in a mixture. When the organic solvent is used in a mixture, the mixture ratio may be controlled in accordance with a desirable battery performance.

The non-aqueous electrolyte solution may further include an overcharge inhibitor additive such as ethylenecarbonate, pyrocarbonate, or the like.

The lithium salt may be dissolved in an organic solvent. The lithium salt supplies lithium ions in a battery, basically operates the rechargeable lithium battery, and improves lithium ion transportation between positive and negative electrodes therein.

Specific examples of the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g. an integer of 1 to 20, LiCl, LiI, $LiB(C_2O_4)_2$ (lithium bis(oxalato) borate, LiBOB), or a combination thereof.

The lithium salt may be used in a concentration ranging from about 0.1 M to about 2.0 M. When the lithium salt is included within the above concentration range, an electrolyte solution may have excellent performance and lithium ion mobility due to optimal electrolyte conductivity and viscosity.

The separator 113 may include a suitable material for separating the negative electrode 112 from the positive electrode 114 and providing a transporting passage of lithium ion. The separator 113 may have a low resistance to ion transport and an excellent impregnation for electrolyte solution. For example, the separator 113 may be selected from glass fiber, polyester, polyethylene, polypropylene, polytetrafluoroethylene (PTFE), or a combination thereof. The separator 113 may have a form of a non-woven fabric or a woven fabric. For example, for the lithium ion battery, a polyolefin-based polymer separator such as polyethylene, polypropylene, or the like may be used. In order to ensure suitable heat resistance or mechanical strength, a coated separator including a ceramic component or a polymer material may be used. In various implementation, the separator 113 may have a mono-layered or a multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATION OF POSITIVE ACTIVE MATERIAL

Example 1

Lithium carbonate, sodium hydroxide, cobalt hydroxide, and zirconium hydroxide in a mole ratio according to the final composition were mixed with a ball in a pulverizing container and pulverized under an argon atmosphere for 3 hours. The pulverized mixture was put into a furnace and heat-treated at 850° C. for 12 hours while a dry air was flowed in, and then the heat-treated mixture was cooled down in the furnace, preparing a positive active material of $(Li_{0.95}Na_{0.05})(Co_{0.95}Zr_{0.05})O_2$.

Example 2

A positive active material of $(Li_{0.966}Na_{0.0333})(Co_{0.966}Zr_{0.033})O_2$ was prepared according to the same method as Example 1 except for mixing lithium carbonate, sodium hydroxide, cobalt hydroxide, and zirconium hydroxide in a mole ratio according to the final composition.

Comparative Example 1

Lithium carbonate and cobalt hydroxide were mixed with a ball in a pulverizing container and pulverized for 3 hours under an argon atmosphere. The pulverized mixture was put in a furnace and heat-treated at 850° C. for 12 hours while dry air was flowed in and then, the heat-treated mixture was cooled down in the furnace, preparing a positive active material of $LiCoO_2$.

Comparative Example 2

Lithium carbonate, cobalt hydroxide, and zirconium hydroxide according to a mole ratio in a final composition were put with a ball in a pulverizing container and pulverized under an argon atmosphere for 2 hours. The pulverized mixture was put in a furnace and heat-treated at 800° C. for 24 hours while dry air was flowed in and then, the heat-treated mixture was cooled down, preparing a positive active material of $Li_{1.1}(Co_{0.95}Zr_{0.05})O_2$.

Comparative Example 3

Lithium carbonate, sodium hydroxide, and cobalt hydroxide according to a mole ratio in a final composition were mixed with a ball in a pulverizing container and pulverized under an argon atmosphere for 6 hours. The pulverized mixture was put in a furnace and heat-treated at 950° C. for 12 hours while dry air was made to flow therein and then, cooled down, preparing a positive active material of $(Li_{0.95}Na_{0.05})CoO_2$.

(Manufacture of Rechargeable Lithium Battery Cell)

85 wt % of each positive active material according to Examples 1 and 2 and

Comparative Examples 1 to 3, 7.5 wt % of polyvinylidene fluoride (PVDF), and 7.5 wt % of acetylene black were mixed and then, dispersed into N-methyl-2-pyrrolidone, preparing a slurry. The slurry was coated onto an aluminum foil and then dried and compressed, thereby manufacturing a positive electrode.

The positive electrode and a metal lithium as its counter electrode were used to manufacture a coin-type half-cell. An electrolyte solution was prepared by mixing ethylenecarbonate (EC), ethylmethylcarbonate (EMC), and dimethylcarbonate (DMC) (EC:EMC:DMC=3:3:4 of a volume ratio) and dissolving 1.15 M $LiPF_6$ in the mixed solvent.

Evaluation 1: Li ion Conductivity

Figure 2:
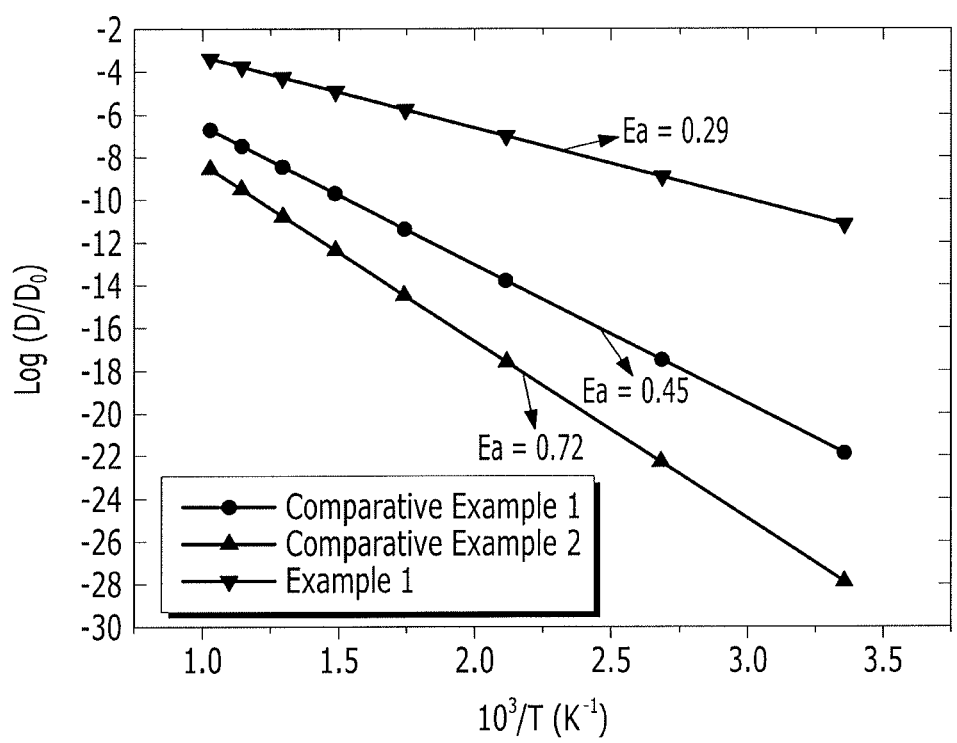
FIG. 2 illustrates a graph showing Li ion conductivity of positive active materials for a rechargeable lithium battery according to Example 1 and Comparative Examples 1 and 2.

Li ion conductivity of the positive active materials according to Example 1 and Comparative Examples 1 and 2 was evaluated, and the results are provided in FIG. 2.

FIG. 2 is a graph showing Li ion conductivity of the positive active materials for a rechargeable lithium battery according to Example 1 and Comparative Examples 1 and 2.

Referring to FIG. 2, the positive active material including a small amount of Na substituted for Li and a small amount of Zr substituted for Co according to Example 1 showed a higher ion conductivity, as compared with the positive active material not doped according to Comparative Example 1 and the positive active material doped in only a Co position with Zr according to Comparative Example 2. Accordingly, a rechargeable lithium battery cell manufactured by applying the positive active material according to one embodiment is expected to show improved rate capability.

Evaluation 2: Rate Capability

Figure 3:
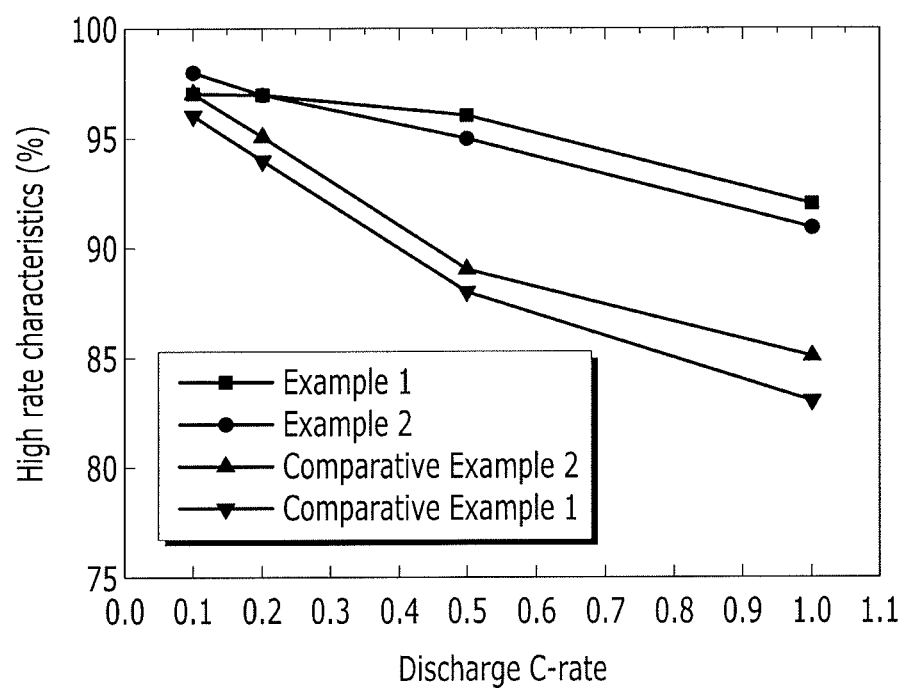
FIG. 3 illustrates a graph showing high rate capability of rechargeable lithium battery cells according to Examples 1 and 2 and Comparative Examples 1 and 2.

The rate capability of rechargeable lithium battery cells according to Examples 1 and 2 and Comparative Examples 1 and 2 was evaluated under the following charge and discharge condition, and the results are provided in FIG. 3.

The cells were constant current-charged at 25° C. at 0.1 C of a current up to a voltage of 4.6 V, then, constant voltage-charged until the current became 0.05 C while 4.6 V was maintained, and subsequently, the cells were constant current-discharged at 0.1 C of a current down to a voltage of 2.0 V; the cells were constant current-charged at 25° C. at 0.1 C of a current up to a voltage of 4.6 V, then, constant voltage-charged until the current became 0.05 C while 4.6 V was maintained, and subsequently, the cells were constant current-discharged at 0.2 C of a current down to a voltage of 2.0 V; the cells were constant current-charged at 25° C. at 0.1 C of a current up to a voltage of 4.6 V, then, constant voltage-charged until the current became 0.05 C while 4.6 V was maintained, and subsequently, the cells were constant current-discharged at 0.5 C of a current down to a voltage of 2.0 V; and the cells were constant current-charged at 25° C. at 0.1 C of a current up to a voltage of 4.6 V, then, constant voltage-charged until the current became 0.05 C while 4.6 V was maintained, and subsequently, the cells were constant current-discharged at 1 C of a current down to a voltage of 2.0 V.

FIG. 3 illustrates a graph showing high rate capability of the rechargeable lithium battery cells according to Examples 1 and 2 and Comparative Examples 1 and 2.

Referring to FIG. 3, the cells using the positive active materials including a small amount of Na substituted for Li and a small amount of Zr substituted for Co according to Examples 1 and 2 showed a higher rate capability than the cells using the positive active material not doped according to Comparative Example 1 and the positive active material doped only in a Co position with Zr according to Comparative Example 2.

By way of summation and review, $LiCoO_2$ has a layered structure of a hexagonal system, in which Li and Co are separated by an oxygen layer. $LiCoO_2$ typically has a lattice expansion at maximum in a z-axis direction of about 3%. Efforts have been made to address lattice expansion by coating a metal oxide on the surface of the $LiCoO_2$.

Lattice expansion of $LiCoO_2$ forms an oxygen cavity in the lattice and thus, is accompanied by distortion of $CoO_6$ after deintercalation of Li from the electronic structure of the material. Thus, such lattice expansion may deteriorate performance.

Embodiments provide a positive active material for a rechargeable lithium battery having improved stability and rate capability as well as maintaining basic properties of a $LiCoO_2$ material.

Embodiments further provide a method of preparing the positive active material for a rechargeable lithium battery and a rechargeable lithium battery including the positive active material.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A positive active material for a rechargeable lithium battery, the positive active material comprising lithium metal oxide represented by the following Chemical Formula 1:

$(Li_{1-x}Na_x)(Co_{1-(a+b)}Zr_aM'_b)O_2$     [Chemical Formula 1]

wherein,
0.020<x≤0.1, 0<a≤0.1, 0≤b≤0.1 and 0<a+b≤0.1,
M' is at least one element selected from Y, Nb, V, Cr, Mn, Fe, Ni, Cu, Zn, Mg, Ca, and Sr, and
the lithium metal oxide is obtained by substituting Li in lithium cobalt oxide with Na in an amount of Na that satisfies 0<x≤0.1 and substituting Co in lithium cobalt oxide with Zr in an amount of Zr that satisfies 0<a≤0.1.

2. The positive active material for a rechargeable lithium battery as claimed in claim 1, wherein the lithium metal oxide has the following ranges:
0.020<x≤0.05, 0<a≤0.05, 0≤b≤0.05 and 0<a+b≤0.05 in Chemical Formula 1.

3. The positive active material for a rechargeable lithium battery as claimed in claim 1, wherein the lithium metal oxide is represented by the following Chemical Formula 2:

$(Li_{1-x}Na_x)(Co_{1-a}Zr_a)O_2$     [Chemical Formula 2]

wherein, 0.020<x≤0.05 and 0.001<a≤0.05.

4. The positive active material for a rechargeable lithium battery as claimed in claim 1, wherein the lithium metal oxide is represented by the following Chemical Formula 1a:

$(Li_{0.95} Na_x)(Co_{1-(a+b)}Zr_aM'_b)O_2$     [Chemical Formula 1a]

wherein,
x=0.05, 0<a≤0.1, 0≤b≤0.1 and 0<a+b≤0.1, and M' is at least one element selected from Y, Nb, V, Cr, Mn, Fe, Ni, Cu, Zn, Mg, Ca, and Sr.

5. The positive active material for a rechargeable lithium battery as claimed in claim 1, wherein the lithium metal oxide is represented by the following Chemical Formula 1b:

$(Li_{0.95}Na_{0.05})(Co_{0.95}Zr_{0.05})O_2$.     [Chemical Formula 1b]

6. The positive active material for a rechargeable lithium battery as claimed in claim 1, wherein the lithium metal oxide is represented by the following Chemical Formula 1c:

$Li_{0.966}Na_{0.0333})(Co_{0.966}Zr_{0.0333})O_2$.     [Chemical Formula 1c]

7. A method of preparing a positive active material for a rechargeable lithium battery, the method comprising:
mixing one of Li and a Li raw material, one of Co and a Co raw material, one of Na and a Na raw material and one of Zr and a Zr raw material, optionally one of K and a raw material of K, and optionally one of a metal represented by M' and a raw material of the metal represented by M' to obtain a mixture; and
heat-treating the mixture to prepare lithium metal oxide represented by the Chemical Formula 1:

$(Li_{1-x}Na_x)(Co_{1-(a+b)}Zr_aM'_b)O_2$     [Chemical Formula 1]

wherein,
0.020<x≤0.1, 0<a≤0.1, 0≤b≤0.1 and 0<a+b≤0.1, and M' is at least one element selected from Y, Nb, V, Cr, Mn, Fe, Ni, Cu, Zn, Mg, Ca, and Sr.

* * * * *